United States Patent [19]
Nozaki et al.

[11] Patent Number: 5,381,430
[45] Date of Patent: Jan. 10, 1995

[54] OPTICAL WAVELENGTH CONVERTING APPARATUS

[75] Inventors: Nobuharu Nozaki; Takashi Adachi, both of Kanagawa, Japan

[73] Assignee: Fuji Photo Film Co., Ltd., Kanagawa, Japan

[21] Appl. No.: 233,932

[22] Filed: Apr. 28, 1994

[30] Foreign Application Priority Data

Apr. 27, 1993 [JP] Japan .................. 5-100844

[51] Int. Cl.6 ............................................. H01S 3/10
[52] U.S. Cl. .................................... 372/21; 372/22; 359/326; 359/328
[58] Field of Search ............... 372/21, 22, 34, 98, 372/70; 359/326, 328

[56] References Cited

U.S. PATENT DOCUMENTS

| 4,730,335 | 3/1988 | Clark et al. | 372/21 |
| 4,731,795 | 3/1988 | Clark et al. | 372/22 |
| 5,150,376 | 9/1992 | Ohmori et al. | 372/107 |
| 5,170,409 | 12/1992 | Nightingale et al. | 372/34 |
| 5,222,088 | 6/1993 | Amano | 372/22 |
| 5,265,115 | 11/1993 | Amano | 372/70 |

Primary Examiner—Georgia Y. Epps
Assistant Examiner—Robert E. Wise

[57] ABSTRACT

An optical wavelength converting apparatus comprises an optical wavelength converting device, which is constituted of a crystal of a nonlinear optical material and converts a wavelength of an incident fundamental wave into a different wavelength, a holder, which is constituted of a metal and to which the optical wavelength converting device is adhered and secured, and a device for adjusting the temperature of the region containing the optical wavelength converting device. The optical wavelength converting device is secured to the holder by adhering only the surface of the optical wavelength converting device to the holder, which surface is normal to the direction of a crystallographic axis that has a coefficient of thermal expansion most different from the coefficient of thermal expansion of the metal constituting the holder among the coefficients of thermal expansion of the crystallographic axes of the optical wavelength converting device. The optical wavelength converting device is thus reliably secured to the holder and prevented from breaking or being distorted due to a change in environmental temperature, and the accuracy, with which the temperature of the optical wavelength converting device is adjusted, is kept high.

6 Claims, 3 Drawing Sheets

DIRECTION OF INCIDENCE OF FUNDAMENTAL WAVE

OPTICAL WAVELENGTH CONVERTING APPARATUS

BACKGROUND OF THE INVENTION

1. Field of the Invention

This invention relates to an optical wavelength converting apparatus provided with an optical wavelength converting device for converting a fundamental wave into its second harmonic, or the like. This invention particularly relates to an optical wavelength converting apparatus, which is provided with an improved structure for mounting the optical wavelength converting device on a holder.

2. Description of the Prior Art

Various attempts have heretofore been made to convert the fundamental wave of a laser beam into its second harmonic, or the like, e.g. to shorten the wavelength of a laser beam, by using a crystal of a nonlinear optical material. As optical wavelength converting devices for carrying out such wavelength conversion, there have heretofore been known a bulk crystal type of optical wavelength converting device, an optical waveguide type of optical wavelength converting device, and the like.

By way of example, the optical wavelength converting device of this type is combined with a laser diode pumped solid laser or is employed in a structure comprising a semiconductor laser, which serves as a fundamental wave source, and an external resonator. In such cases, the optical wavelength converting device is ordinarily located in the region inside of the resonator. In general, the temperature of such a resonator is very accurately adjusted such that the resonator length may be kept constant. In such cases, the temperature of the optical wavelength converting device, which is located in the region inside of the resonator, is also adjusted.

The optical wavelength converting device described above is mounted on a holder and is secured at a predetermined position such that its optical axis may align with the optical axis of a laser, which serves as a fundamental wave source, a condensing lens, or the like. As the structure for mounting the optical wavelength converting device on the holder, two types of structures have heretofore been known. In one of the structures, the optical wavelength converting device is mounted on the holder by using a crystal pushing member, which is constituted of a metal, a plastic material, or the like. In the other structure, the optical wavelength converting device is adhered to the holder.

However, with the structure in which the crystal pushing member is utilized, the problems occur in that the optical wavelength converting device moves slightly due to a change in the environmental temperature, or the like, and cannot be secured at the correct position for a long period. In cases where the optical wavelength converting device is located in the region inside of the resonator, if the optical wavelength converting device thus moves to an incorrect position, the resonating conditions of the resonator will vary. As a result, the problems occur in that the intensity and the beam shape of the wavelength-converted wave fluctuate, and noise occurs.

With the structure in which the optical wavelength converting device is adhered to the holder, in cases where the holder is constituted of a metal, such as copper, the problems described below are encountered. Specifically, when a change in the environmental temperature occurs, a large stress is generated in the optical wavelength converting device due to a difference in the coefficient of thermal expansion between the optical wavelength converting device and the holder constituted of the metal. As a result, the optical wavelength converting device breaks or is distorted. A technique for adhering and securing a optical wavelength converting device to a metal material having a coefficient of thermal expansion close to the coefficient of thermal expansion of the optical wavelength converting device is disclosed in, for example, U.S. Pat. No. 5,150,376. However, even if the disclosed technique is applied to a structure for securing the optical wavelength converting device to the holder described above, satisfactory results cannot always be obtained.

Therefore, an attempt has been made to make the holder described above from glass, which has a coefficient of thermal expansion approximately equal to the coefficient of thermal expansion of the optical wavelength converting device. However, such a holder made from the material other than a metal has a low thermal conductivity. Therefore, in cases where the holder made from the material other than a metal is located in the region inside of the resonator, the accuracy, with which the temperature of the optical wavelength converting device is adjusted, cannot be kept high. As a result, the performance of the optical wavelength converting apparatus fluctuates.

SUMMARY OF THE INVENTION

The primary object of the present invention is to provide an optical wavelength converting apparatus, wherein an optical wavelength converting device is reliably secured to a holder and prevented from breaking or being distorted due to a change in environmental temperature, and the accuracy, with which the temperature of the optical wavelength converting device is adjusted, is kept high.

The present invention provides an optical wavelength converting apparatus comprising:
  i) an optical wavelength converting device, which is constituted of a crystal of a nonlinear optical material, and which converts a wavelength of an incident fundamental wave into a different wavelength,
  ii) a holder, to which the optical wavelength converting device is adhered and secured, and
  iii) a means for adjusting the temperature of the region containing the optical wavelength converting device,
  wherein the holder is constituted of a metal, and
  the optical wavelength converting device is adhered and secured to the holder by adhering only the surface of the optical wavelength converting device to the holder, which surface is normal to the direction of a crystallographic axis that has a coefficient of thermal expansion most different from the coefficient of thermal expansion of the metal constituting the holder among the coefficients of thermal expansion of the crystallographic axes of the optical wavelength converting device.

In many cases, the coefficient of thermal expansion of a nonlinear optical material varies for different crystallographic axis of the nonlinear optical material. As described above, when the technique disclosed in U.S. Pat. No. 5,150,376 is applied to the structure for securing an optical wavelength converting device to a holder, satisfactory results cannot always be obtained. This is because the anisotropy of the coefficient of thermal expansion is not taken into consideration. Specifically, in cases where a material, which is considered as having a coefficient of thermal expansion close to the coefficient of thermal expansion of the optical wavelength converting device, is selected as the material for the holder, if the anisotropy of the coefficient of thermal expansion is not taken into consideration, it will often occur that the coefficient of thermal expansion of the optical wavelength converting device and the coefficient of thermal expansion of the holder are far different from each other with respect to the directions, which are included in the plane of adhesion between the optical wavelength converting device and the holder. In such cases, if a change in the environmental temperature occurs, a large stress will be generated in the optical wavelength converting device due to a difference in the coefficient of thermal expansion between the optical wavelength converting device and the holder. As a result, the optical wavelength converting device will break or will be distorted.

With the optical wavelength converting apparatus in accordance with the present invention, the optical wavelength converting device is adhered and secured to the holder by adhering only the surface of the optical wavelength converting device to the holder, which surface is normal to the direction of the crystallographic axis that has a coefficient of thermal expansion most different from the coefficient of thermal expansion of the metal constituting the holder among the coefficients of thermal expansion of the crystallographic axes of the optical wavelength converting device. Therefore, the problems do not occur in that the coefficient of thermal expansion of the optical wavelength converting device and the coefficient of thermal expansion of the holder are far different from each other with respect to the directions, which are included in the plane of adhesion between the optical wavelength converting device and the holder. Accordingly, even if a change in the environmental temperature occurs, a large stress will not be generated in the optical wavelength converting device due to a difference in the coefficient of thermal expansion between the optical wavelength converting device and the holder. As a result, the optical wavelength converting device can be prevented from breaking or being distorted.

Also, with the optical wavelength converting apparatus in accordance with the present invention, the holder is constituted of a metal. Therefore, heat conduction can be effected sufficiently between the optical wavelength converting device and the means for adjusting the temperature of the region containing the optical wavelength converting device. Accordingly, the accuracy, with which the temperature of the optical wavelength converting device is adjusted, can be kept high.

DESCRIPTION OF THE PREFERRED EMBODIMENTS

The present invention will hereinbelow be described in further detail with reference to the accompanying drawings.

Figure 2:
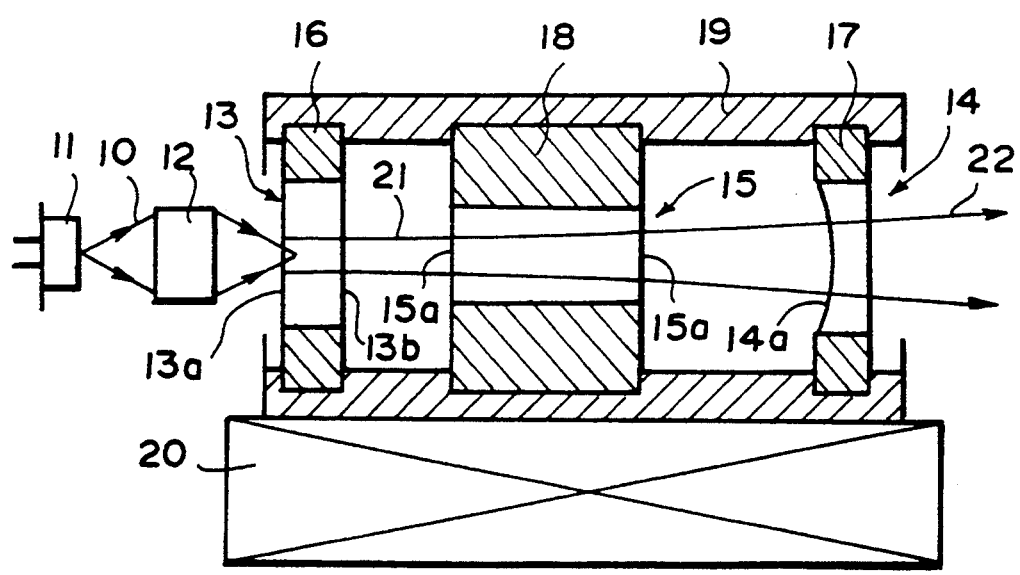
FIG. 2 is a schematic side view showing the first embodiment of the optical wavelength converting apparatus in accordance with the present invention.

FIG. 2 is a schematic side view showing a first embodiment of the optical wavelength converting apparatus in accordance with the present invention.

With reference to FIG. 2, the first embodiment of the optical wavelength converting apparatus in accordance with the present invention is built in a laser diode pumped solid laser. The laser diode pumped solid laser is provided with a semiconductor laser 11, which produces a laser beam 10 serving as a pumping beam, and a condensing lens 12, which condenses the laser beam 10 having been produced as divergent light and which may be constituted of a rod lens, or the like. The laser diode pumped solid laser is also provided with a $YVO_4$ crystal 13, which is a solid laser medium doped with neodymium (Nd). The $YVO_4$ crystal 13 doped with neodymium (Nd) will hereinafter be referred to as the $Nd:YVO_4$ crystal 13. The laser diode pumped solid laser is further provided with a resonator mirror 14, which is located on the side downstream (i.e. the right side in FIG. 2) from the $Nd:YVO_4$ crystal 13. A crystal 15 of KTP, which serves as a nonlinear optical material, is located between the $Nd:YVO_4$ crystal 13 and the resonator mirror 14.

The $Nd:YVO_4$ crystal 13, the resonator mirror 14, and the KTP crystal 15 are respectively secured to a barrel 19 by approximately disk-like holders 16, 17, and 18, which are constituted of copper having a high thermal conductivity. The barrel 19 is mounted on a Peltier device 20. The temperatures of the $Nd:YVO_4$ crystal 13, the resonator mirror 14, and the KTP crystal 15 are kept at a predetermined temperature by the Peltier device 20 and a temperature adjusting circuit (not shown).

The semiconductor laser 11 produces the laser beam 10 having a wavelength of $\lambda_1 = 809$ nm. The neodymium atoms contained in the $Nd:YVO_4$ crystal 13 are stimulated by the laser beam 10, and the $Nd:YVO_4$ crystal 13 thereby produces a solid laser beam 21 having a wavelength of $\lambda_2 = 1,064$ nm. The solid laser beam 21 impinges upon the KTP crystal 15 and is thereby converted into its green second harmonic 22 having a wavelength of $\lambda_3 = \lambda_2/2 = 532$ nm.

A rear end face 13a and a front end face 13b of the Nd:YVO$_4$ crystal 13, a rear end face 15a and a front end face 15b of the KTP crystal 15, and a concave mirror surface 14a of the resonator mirror 14 are provided with coatings, which have the characteristics shown below with respect to the wavelength of $\lambda_1 = 809$ nm, the wavelength of $\lambda_2 = 1,064$ nm, and the wavelength of $\lambda_3 = 532$ nm. AR represents no reflection (a transmittance of at least 99%), and HR represents high reflection (a reflectivity of at least 99.9%).

|  | 809 nm | 1,064 nm | 532 nm |
| --- | --- | --- | --- |
| End face 13a | AR | HR | — |
| End face 13b | — | AR | HR |
| End face 15a | — | AR | AR |
| End face 15b | — | AR | AR |
| Mirror surface 14 | — | HR | AR |

Because the coatings described above are provided, the laser beam 21 resonates between the end face 13a of the Nd:YVO$_4$ crystal 13 and the mirror surface 14a. The laser beam 21 impinges in the resonating state upon the KTP crystal 15. Therefore, the laser beam 21 is sufficiently absorbed by the KTP crystal 15, and the second harmonic 22 can be produced efficiently. The second harmonic 22 passes through the resonator mirror 14 directly or after being reflected from the end face 13b of the Nd:YVO$_4$ crystal 13 towards the resonator mirror 14.

Figure 3:
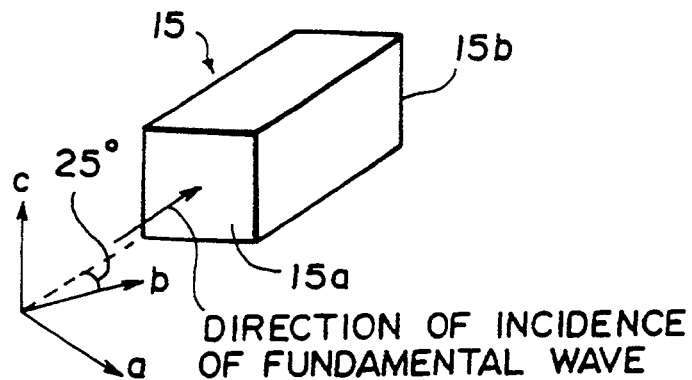
FIG. 3 is an explanatory view showing the relationship between crystallographic axes of an optical wavelength converting device and the direction of incidence of a fundamental wave in the first embodiment of the optical wavelength converting apparatus in accordance with the present invention.

FIG. 3 is an explanatory view showing the relationship between crystallographic axes a, b, and c of the KTP crystal 15, which has been cut into a rectangular parallelepiped shape, and the direction of incidence of the solid laser beam 21 serving as the fundamental wave in the first embodiment of the optical wavelength converting apparatus in accordance with the present invention. The coefficient of thermal expansion $\alpha$ of copper, which is employed as the material of the holder 18 for securing the KTP crystal 15, the coefficient of thermal expansion $\alpha_a$ of the KTP crystal 15 in the direction of the crystallographic axis a, the coefficient of thermal expansion $\alpha_b$ of the KTP crystal 15 in the direction of the crystallographic axis b, and the coefficient of thermal expansion $\alpha_c$ of the KTP crystal 15 in the direction of the crystallographic axis c take values shown below (units: $\times 10^{-6}/°C.$).

$\alpha = 16.7$ $\alpha_a = 8.7, \alpha_b = 10.5, \alpha_c = -0.2$

Figure 1:
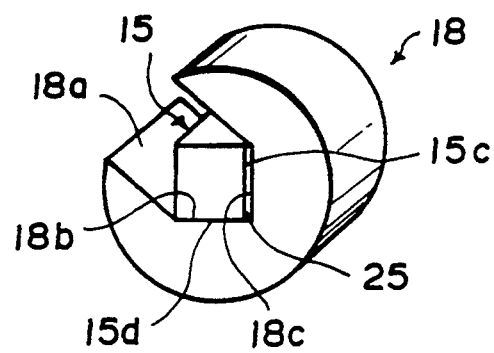
FIG. 1 is a perspective view showing a major part of a first embodiment of the optical wavelength converting apparatus in accordance with the present invention.

As illustrated in detail in FIG. 1, the holder 18 is made from an approximately disk-like member and provided with a cutaway portion 18a, through which the crystal is to be inserted, and crystal support surfaces 18b and 18c, which make an angle of 90° with respect to each other. The KTP crystal 15 is secured to the holder 18 by adhering only an end face 15c of the KTP crystal 15 to the crystal support surface 18c of the holder 18. The end face 15c is normal to the direction of the crystallographic axis c that has the coefficient of thermal expansion $\alpha_c$ most different from the coefficient of thermal expansion $\alpha$ of copper among the coefficients of thermal expansion of the crystallographic axes a, b, and c of the KTP crystal 15. An end face 15d of the KTP crystal 15 is merely in close contact with the other crystal support surface 18b of the holder 18. By way of example, the adhesion is effected by using a known resin. An adhesive layer 25 is formed between the end face 15c of the KTP crystal 15 and the crystal support surface 18c of the holder 18.

With the embodiment wherein the KTP crystal 15 is adhered to the holder 18 in the manner described above, the problems do not occur in that the coefficient of thermal expansion of the KTP crystal 15 and the coefficient of thermal expansion of the holder 18 are far different from each other with respect to the directions, which are included in the plane of adhesion between the KTP crystal 15 and the holder 18. Specifically, the coefficient of thermal expansion of the KTP crystal 15 with respect to an arbitrary direction, which is included in the plane of adhesion between the KTP crystal 15 and the holder 18, does not contain the component of the coefficient of thermal expansion $\alpha_c$, and takes a value falling within the range of $\alpha_a$ to $\alpha_b$. Therefore, the coefficient of thermal expansion of the KTP crystal 15 with respect to an arbitrary direction, which is included in the plane of adhesion between the KTP crystal 15 and the holder 18, takes a value close to the coefficient of thermal expansion $\alpha$ of copper. Accordingly, even if a change in the environmental temperature occurs, a large stress will not be generated in the KTP crystal 15 due to a difference in the coefficient of thermal expansion between the KTP crystal 15 and the holder 18. As a result, the KTP crystal 15 can be prevented from breaking or being distorted.

Also, with this embodiment, the holder 18 is constituted of copper having a high thermal conductivity. Therefore, heat conduction can be effected sufficiently between the KTP crystal 15 and the Peltier device 20 for adjusting the temperature of the region containing the KTP crystal 15. Accordingly, the accuracy, with which the temperature of the KTP crystal 15 is adjusted, can be kept high.

In experiments for confirming the effects of the first embodiment of the optical wavelength converting apparatus in accordance with the present invention, the holder 18, to which the KTP crystal 15 had been adhered and secured in the manner described above, was subjected to a storage temperature cycle, in which the temperature was changed within the range of $-20°$ C. to $+60°$ C. Thereafter, the state of the KTP crystal 15 was investigated. In the experiments, no sign of cracking and distortion of the KTP crystal 15 was observed.

Figure 4:
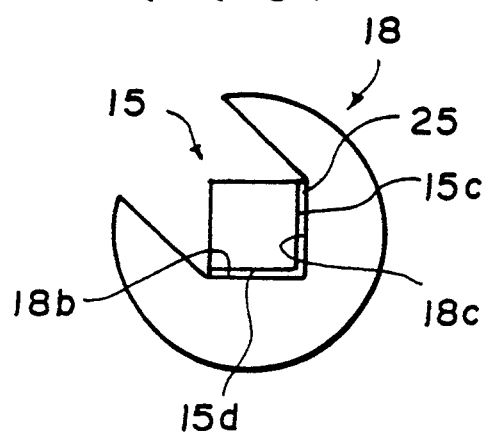
FIG. 4 is a front view showing a structure for mounting an optical wavelength converting device on a holder, the view serving as an aid in explaining a comparative example.

Also, in Comparative Example 1, as illustrated in FIG. 4, a sample was prepared by adhering the two end faces 15c and 15d of the KTP crystal 15 to the holder 18. The sample was subjected to the same storage temperature cycle as that described above. After the KTP crystal 15 had been subjected to the storage temperature cycle, cracks and distortion occurred in the KTP crystal 15.

Figure 5:
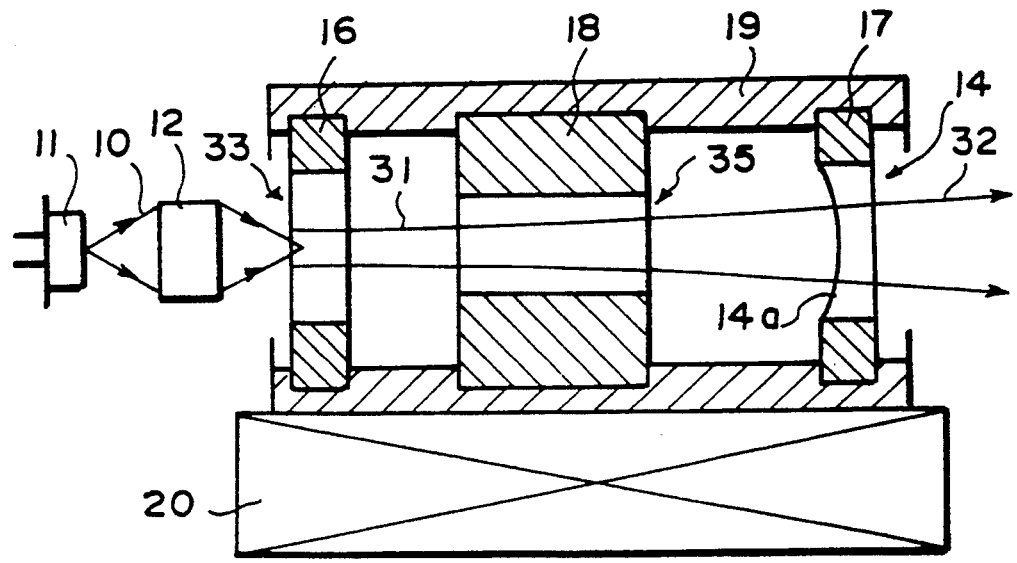
FIG. 5 is a schematic side view showing a second embodiment of the optical wavelength converting apparatus in accordance with the present invention.
Figure 6:
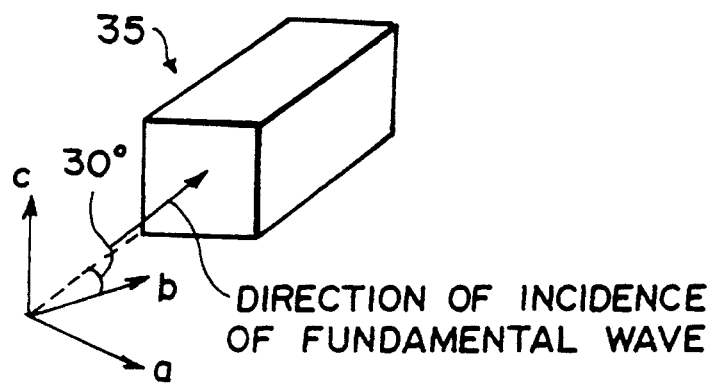
FIG. 6 is an explanatory view showing the relationship between crystallographic axes of an optical wavelength converting device and the direction of incidence of a fundamental wave in the second embodiment of the optical wavelength converting apparatus in accordance with the present invention.
Figure 7:
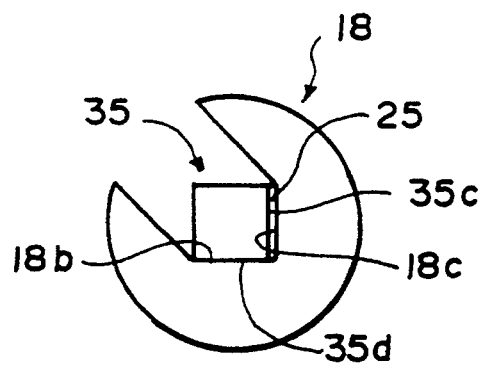
FIG. 7 is a perspective view showing a major part of the second embodiment of the optical wavelength converting apparatus in accordance with the present invention.

A second embodiment of the optical wavelength converting apparatus in accordance with the present invention will be described hereinbelow with reference to FIGS. 5, 6, and 7. In FIGS. 5, 6, and 7, similar elements are numbered with the same reference numerals with respect to FIGS. 1, 2, and 3. As illustrated in FIG. 5, the second embodiment is substantially different from the first embodiment in that a Nd:YAG crystal 33 is employed in lieu of the Nd:YVO$_4$ crystal 13, and in that a KN crystal 35 is employed in lieu of the KTP crystal 15.

The Nd:YAG crystal 33 is a solid laser medium doped with neodymium (Nd). The neodymium atoms contained in the Nd:YAG crystal 33 are stimulated by the laser beam 10, which has been produced by the semiconductor laser 11 and has a wavelength of $\lambda_1 = 808$ nm, and the Nd:YAG crystal 33 thereby produces a solid laser beam 31 having a wavelength of $\lambda_2 = 946$ nm. The solid laser beam 31 impinges upon the KN crystal 35, which serves as a nonlinear optical material, and is thereby converted into its blue second harmonic 32 having a wavelength of $\lambda_3 = \lambda_2/2 = 473$ nm.

FIG. 6 is an explanatory view showing the relationship between crystallographic axes a, b, and c of the KN crystal 35, which has been cut into a rectangular parallelepiped shape, and the direction of incidence of the solid laser beam 31 serving as the fundamental wave in the second embodiment of the optical wavelength converting apparatus in accordance with the present invention. The coefficient of thermal expansion $\alpha$ of copper, which is employed as the material of the holder 18 for securing the KN crystal 35, the coefficient of thermal expansion $\alpha_a$ of the KN crystal 35 in the direction of the crystallographic axis a, the coefficient of thermal expansion $\alpha_b$ of the KN crystal 35 in the direction of the crystallographic axis b, and the coefficient of thermal expansion $\alpha_c$ of the KN crystal 35 in the direction of the crystallographic axis c take values shown below (units: $\times 10^{-6}/°C$.).

$$\alpha = 16.7$$

$$\alpha_a = 5.0, \alpha_b = 14.0, \alpha_c = 0.5$$

In the second embodiment, the KN crystal 35 is secured to the holder 18 by adhering only an end face 35c of the KN crystal 35 to the crystal support surface 18c of the holder 18. The end face 35c is normal to the direction of the crystallographic axis c that has the coefficient of thermal expansion $\alpha_c$ most different from the coefficient of thermal expansion $\alpha$ of copper among the coefficients of thermal expansion of the crystallographic axes a, b, and c of the KN crystal 35. Therefore, the problems do not occur in that the coefficient of thermal expansion of the KN crystal 35 and the coefficient of thermal expansion of the holder 18 are far different from each other with respect to the directions, which are included in the plane of adhesion between the KN crystal 35 and the holder 18. Accordingly, even if a change in the environmental temperature occurs, a large stress will not be generated in the KN crystal 35 due to a difference in the coefficient of thermal expansion between the KN crystal 35 and the holder 18. As a result, the KN crystal 3 can be prevented from breaking or being distorted.

Also, with the second embodiment, the holder 18 is constituted of copper having a high thermal conductivity. Therefore, heat conduction can be effected sufficiently between the KN crystal 35 and the Peltier device 20 for adjusting the temperature of the region containing the KN crystal 35. Accordingly, the accuracy, with which the temperature of the KN crystal 35 is adjusted, can be kept high.

In experiments for confirming the effects of the second embodiment of the optical wavelength converting apparatus in accordance with the present invention, the holder 18, to which the KN crystal 35 had been adhered and secured in the manner described above, was subjected to a storage temperature cycle, in which the temperature was changed within the range of $-20°$ C. to $+60°$ C. Thereafter, the state of the KN crystal 35 was investigated. In the experiments, no sign of cracking and distortion of the KN crystal 35 was observed.

Figure 8:
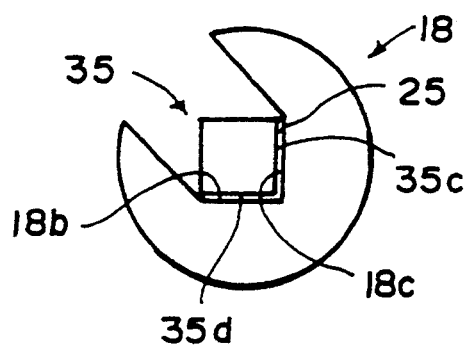
FIG. 8 is a front view showing a structure for mounting an optical wavelength converting device on a holder, the view serving as an aid in explaining a comparative example.

Also, in Comparative Example 2, as illustrated in FIG. 8, a sample was prepared by adhering the two end faces 35c and 35d of the KN crystal 35 to the holder 18. The sample was subjected to the same storage temperature cycle as that described above. After the KN crystal 35 had been subjected to the storage temperature cycle, cracks and distortion occurred in the KN crystal 35.

In the embodiments described above, the optical wavelength converting apparatus in accordance with the present invention is applied to the laser diode pumped solid laser for converting the fundamental wave into its second harmonic. The optical wavelength converting apparatus in accordance with the present invention is also applicable when fundamental waves are converted into a wave having a frequency equal to the difference between or the sum of the frequencies of the fundamental waves. Also, nonlinear optical materials and holder materials, which are other than those described above, may be employed.

What is claimed is:

1. An optical wavelength converting apparatus comprising:

i) an optical wavelength converting device, which is constituted of a crystal of a nonlinear optical material, and which converts a wavelength of an incident fundamental wave into a different wavelength, ii) a holder, to which the optical wavelength converting device is adhered and secured, and iii) a means for adjusting the temperature of the region containing the optical wavelength converting device, wherein the holder is constituted of a metal, and the optical wavelength converting device is adhered and secured to the holder by adhering only the surface of the optical wavelength converting device to the holder, which surface is normal to the direction of a crystallographic axis that has a coefficient of thermal expansion most different from the coefficient of thermal expansion of the metal constituting the holder among the coefficients of thermal expansion of the crystallographic axes of the optical wavelength converting device.

2. An apparatus as defined in claim 1 wherein the fundamental wave is produced by a semiconductor laser.

3. An apparatus as defined in claim 1 wherein the fundamental wave is converted into its second harmonic.

4. An apparatus as defined in claim 1 wherein the means for adjusting the temperature of the region containing the optical wavelength converting device comprises a Peltier device.

5. An apparatus as defined in claim 1 wherein a laser beam, which has been obtained by pumping a solid laser medium, impinges as the fundamental wave upon the optical wavelength converting device.

6. An apparatus as defined in claim 5 wherein a pumping source for pumping the solid laser medium is a laser diode.

* * * * *